Sept. 8, 1970  A. S. FARR  3,527,258

FLEXIBLE TUBING

Original Filed May 4, 1967

INVENTOR.
ALFRED S. FARR
BY
Staelin & Overman
ATTORNEYS

United States Patent Office 3,527,258
Patented Sept. 8, 1970

3,527,258
FLEXIBLE TUBING
Alfred S. Farr, Granville, Ohio, assignor to Owens-Corning Fiberglas Corporation, a corporation of Delaware
Continuation of application Ser. No. 636,113, May 4, 1967. This application Apr. 28, 1969, Ser. No. 824,726
Int. Cl. F16l *11/00*
U.S. Cl. 138—131
11 Claims

ABSTRACT OF THE DISCLOSURE

Flexible tubing comprising a helical coil of wire, connector members secured to each end of the helical coil and a flexible covering over the coil which has an inner layer including a lamina of insulating material and an outer layer including a lamina of vapor barrier material. Unusually high unitary strength is achieved by providing in one of the layers high tensile strength material, such as glass fiber fabric, extending between the connectors in the axial direction of the tubing, and securing the high tensile strength material to the connector members.

This is a continuation of co-pending application Ser. No. 636,113, filed May 4, 1967, and now abandoned.

In today's air conditioning and/or heating systems, whether in new or already existing structures, there is an increasing use of flexible tubing to make short connections, to make connections around corners or in other awkward positions and, in some instances, to provide connections over relatively long distances as the costs of such flexible tubing decreases and as the characteristics thereof are improved. Although some axial tensile strength is required in all applications it becomes increasingly important as longer connections are made within such systems. If the connections are horizontal, various suspensions commercially available may be utilized to assist in carrying the systems. However, good axial tensile strength is necessary since connections are made between a plurality of lengths of tubing and the axial tensile strength is required to support such tubing from suspension means whether support is supplied at the connections of intermediate the lengths of tubing. Further, vertical installations of a number of lengths of flexible tubing obviously require a high axial tensile strength since the means for supporting the lengths of tubing in a vertical direction are more limited than that available for horizontal suspension. By utilizing the embodiments disclosed hereinto enhance the axial tensile strength of the flexible tubing, additional advantages are obtained in that the pressure which the tubing is able to withstand, whether outwardly directed with respect to a pressure or supply line or inwardly directed with respect to a return or suction line is greatly enhanced.

Accordingly it is an object of this invention to provide a new and improved flexible tubing.

It is another object of this invention to provide a new and improved flexible tubing having the desirable properties discussed hereinbefore, which tubing may be installed quickly and inexpensively and is adapted for manufacture at low cost.

A still further object of this invention is to provide a flexible tubing having a strong unitary but still flexible structure.

An additional object of this invention is to provide a flexible tubing which retains excellent sound deadening capabilities without the loss of the unitary structure strength required for many installations.

To obtain the above objects there is described herein a flexible tubing comprising a helical coil of wire, connector members secured to each end of the helical coil and a flexible covering over the coil. The flexible covering has an inner layer including a lamina of insulating material and an outer layer including a lamina of vapor barrier material, one of the layers including high tensile strength materials extending between the connectors in the axial direction of the tubing. Means are then provided for mechanically securing the axially disposed high strength material to the connector members.

The mechanical securing means preferably comprises a strap wrapped around the high tensile strength material and the connector at each end and held in place under tension. The lamina of insulating material may comprise a layer of glass fibers and a binder retaining the fibers in dimensionally stable positions along the length of the tubing to provide high tensile strength.

The inner layer may advantageously include a lamina of fabric constructed from high tensile strength material such as glass fibers or filaments. The lamina of fabric is advantageously disposed adjacent the helical coil and may be adhesively secured to the connector members to aid in providing an air tight seal between the lamina of fabric and the connectors and to hold the lamina of fabric in place while putting the strips in position. The strap may be wrapped around both the insulation lamina and fabric lamina of the inner layer. The strap may be also wrapped around the fabric lamina alone.

The straps are advantageously provided with a protective coating such as nylon to reduce corrosion thereof and to aid in preventing edge cutting of any of the lamina by the straps.

Other objects, advantages and features of this invention will become apparent when the following description is taken in conjunction with the accompanying drawings, in which.

Figure 1:
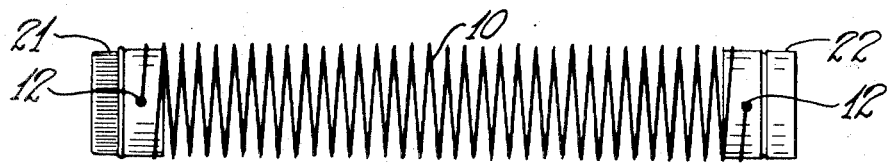
FIG. 1 illustrates a first step in the production of the flexible tubing of this invention.
Figure 2:
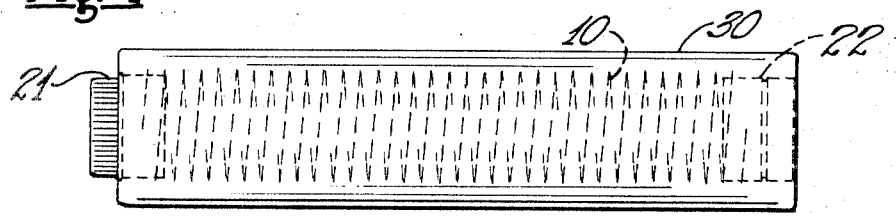
FIG. 2 illustrates a preferred embodiment of this invention when completed.

Referring to FIGS. 1 and 2 there is shown a preferred embodiment of the tubing. FIG. 1 illustrates the first step in constructing the tubing showing a helical coil of corrosive resistant wire 10 as it would appear when wrapped around a mandrel (not shown) to obtain the shape shown in FIG. 1. A pair of end connectors 21, 22 are illustrated as secured to the helical coil 10 at the points 12 by soldering or other suitable means. By securing the connectors 21, 22 to the helical coil 10 in this manner, connections may be made directly to the connectors 21, 22 at specific joints by the use of sheet metal screws or other mechanical fastening means, where in the past the connection was generally solely accomplished by the use of tape. As will be disclosed hereinafter, the securing of the connectors to the helical coil enhances the axial strength characteristics of the flexible tubing in addition to the other features shown. Although it may be desirable to utilize tape when making the joints of a certain application to prevent air leaks or pressure loss in the system, certain of the embodiments hereinafter will reduce the necessity of tape at the joints and/or the quantity of taping required.

The connectors may be stove pipe connectors 21, 22 and are advantageously nested within the ends of the helical coil 10 for easier attachment to the coil and to prevent interference with the interior of the tubing when joints are made with similar connector members of other pieces of flexible tubing or with other ducts of the system.

Figure 3:
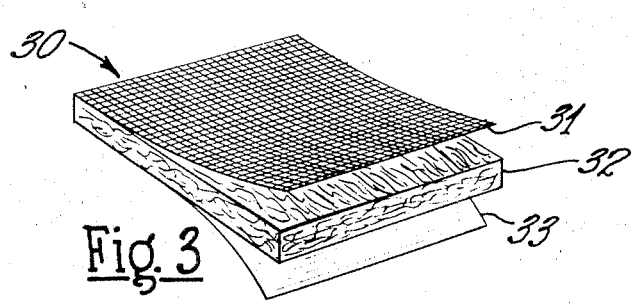
FIG. 3 is a view in perspective of a flexible covering suitable for use in this invention having various layers, and lamina within the layers, peeled away to show the construction thereof.

Referring to FIG. 2 there is illustrated one embodiment of the completed product wherein the flexible coil 10 having the connector members 21, 22 secured to the ends thereof, is covered by a flexible covering 30. In this embodiment the high axial strength of the tubing discussed hereinbefore may be attained by using a flexible covering 30 (see FIG. 3) having an inner layer including a lamina of insulating material 32 and an outer layer having a lamina of a vapor barrier material 33, both layers applied over the helical coil 10 with the insulation lamina 32 adjacent the helical coil 10. One of the two layers includes high tensile strength materials extending between the connectors in the axial direction of the tubing and means are provided for mechanically securing the axially disposed high strength material to the connector members.

In one embodiment the vapor barrier lamina 33 of the outer layer may be provided with axially extending high tensile strength material therein. For example, filaments or fibers may be embedded in or carried within the vapor barrier layer with the alignment of such filaments or fibers, e.g. glass fibers, being longitudinal along the tubing so that when a mechanical securing means is utilized, such as the straps illustrated in FIG. 4, a very high axial tensile strength is attained.

In a second embodiment the lamina of insulating material may comprise a layer of glass fibers and a binder retaining the fibers in dimensionally stable positions along the length of the tubing to provide the high tensile strength material. The high tensile strength of glass fibers is well known. By connecting the fibers at their crossover points with a binder of high strength one attains a group of fibers along the length of such tubing which are dimensionally stable with respect to each other because of the binder joining the fibers. While the binder acts as a high strength connection the fibers provide the flexibility required for the tubing. As an alternative in this embodiment the glass fiber mat may be manufactured in a manner so that continuous fibers are axially disposed along the length of the flexible tubing to provide the high tensile strength required without regard to whether or not discontinuous fibers within the mat are properly joined or connected by a high strength binder. That is, continuous fibers of a length to extend from one end of the tubing or connector to the other end connector are aligned or deposited within the mat so that mechanical connection of both ends of the continuous filaments or fibers to the connectors will provide high axial tensile strength.

In a third embodiment the high tensile strength properties of the flexible tubing may be attained by utilizing a lamina 31 of fabric which is preferably woven from artificial fibers that are not subject to deterioration and have high tensile strengths, e.g. a glass fiber cloth. As with the above embodiments the glass fiber cloth may be mechanically secured to the end connectors to attain the very high tensile strength of the tubing. In addition such glass fiber or other fabric provides an excellent surface to which the helical coil 10 may be adhered. This provides additional strength and insures that successive convolutions of the coil will remain properly spaced. The amount of coil-fabric adhesive may be reduced in such an embodiment so that openings will remain in the fabric to allow the admission of sound from the interior of the tubing to the sound deadening as well as heat insulating lamina 32. A lamina of fabric, preferably having the glass fiber characteristics of strength and smoothness, prevents the erosion of fibers from the insulating lamina 32, provides a substantially smooth interior for the tubing, and aids in guiding the deformation of the insulating lamina 32 between adjacent sections or convolutions of the helical coil 10 whenever the tubing is flexed over a small radius.

If desired the flexible covering 30 may be preassembled to the extent desired to reduce line assembly time when producing the flexible tubing. That is, the fabric lamina 31 and the insulating lamina 32 may be previously assembled and perhaps compressed just before application to the helical coil 10. The fabric lamina and the insulating lamina may be manufactured as a one-piece product by either continuously depositing insulating fibers and a binder on a sheet of the glass fabric as the fabric moves beneath a fiber deposition station, or by juxtaposing a lamina of fabric adjacent an already deposited mat combination of fibers and binder. In a curing process either of the previous methods may attain a one-piece product by providing a sufficient amount of binder to not only adhere the fibers into a dimensionally stable mat but to adhere the fabric to the insulating mat. While it is possible to add the outer or vapor barrier lamina 33, of vinyl or other advantageously scuff resistant material, to the inner layer before assembly to the helical coil 10, it may be preferable to wrap on or apply the inner layer to the helical coil first in widths equal to substantially the length of the tubing desired, and then apply the vapor barrier lamina 33 as a second covering process so that the seams of the layers may be spaced to add to the strength characteristics of the flexible tubing while reducing the chances for air leaks.

Figure 4:
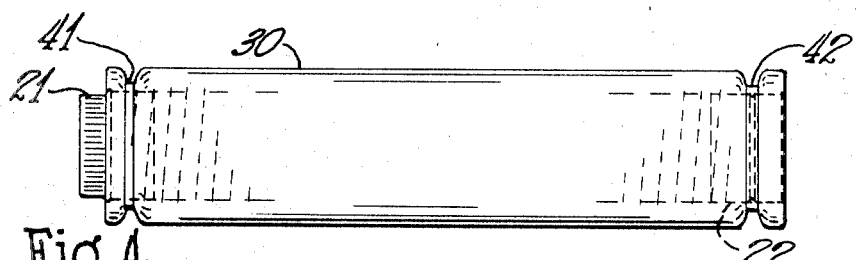
FIG. 4 illustrates a first method of mechanically securing high tensile strength materials to the end connectors.

Referring to FIG. 4 there is illustrated a first method of mechanically securing the high tensile strength material to the end connectors. A strap 41 is wrapped around the flexible covering 30 and the end connector 21 and sealed under tension. The tension is preferably sufficient to hold the flexible covering 30 in an air tight relationship with respect to the connector 21, thus reducing the taping requirements at joints to attain an air tight seal. The strap may be tensioned by a strapping machine which is commercially available, the tensioning device on such a machine, for example, may be set for 15 pounds of air pressure and the sealer-cutoff device set for 50 pounds of air pressure. The strap may be sealed in place with a commercial seal, such as a Signode seal No. 12 STC, to hold the strap in place under the tension desired. The inner lamina may be adhesively secured to the connector members to aid in providing an air tight seal between the inner lamina and the smooth surface of the connectors and to hold the lamina in place while positioning the straps on the connectors. Strap 42 may be similarly placed around connector 22 to mechanically hold the high strength material in place with respect to connector 22.

While the flexible covering 30 in FIG. 4 illustrates the mechanical connection of all of the plurality of lamina in a flexible covering 30, it should be noted that FIG. 4 may also illustrate the mechanically securing in place of the insulation lamina 32 and/or the fabric lamina 31 to the end connectors 21, 22. The outer layer of vapor barrier material may then be put on over the inner layer and the straps 41, 42 holding the inner layer to the connectors. This embodiment provides a smoother outer surface for easier handling in certain installations.

Figure 5:
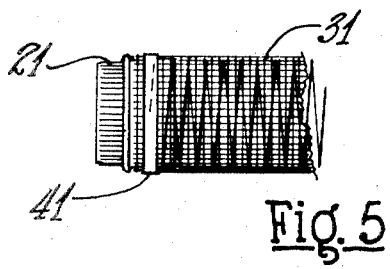
FIG. 5 illustrates a second method of mechanically connecting high tensile strength material to an end connector.

Referring to FIG. 5 there is illustrated an alternative step in making the flexible tubing of this invention in which the mechanical securing means 41 is applied only over an inner lamina of glass fabric or other high strength cloth 31 to mechanically hold the fabric on the connector 21. In this instance the fabric lamina 31 may advantageously be adhesively secured to the smooth surface of the connector prior to the strapping operation to aid in providing an air tight seal between the lamina of fabric and the connectors and to hold the lamina of fabric in place while putting the strap in position.

The use of strap materials which have a protective coating thereon, such as nylon, prevent corrosion of the straps and thus failure, while also aiding in preventing edge cutting by the straps of one or more of the layers of the flexible covering.

As disclosed hereinbefore it may be seen that a substantially unitary structure is attained while retaining sufficient flexibility to make a 180° turn with the tubing over a small radius without collapsing or otherwise reducing the effectiveness of the tubing. Further, the securing of high tensile strength material to the end connectors provides additional strength to the flexible tubing whether forces are directed outwardly, as in a pressure or supply line, or whether forces are directed inwardly, as in a return or suction line. If the lengths of flexible tubing are connected and held in tension, the axially disposed and mechanically secured high tensile strength materials assist in maintaining an open duct whether or not a rupture from abnormal use has caused the failure of one of the layers in the flexible covering.

In conclusion, it is pointed out that while illustrated examples constitute practical embodiments of this invention, it is not intended to limit the invention to the exact details shown since modifications may be made without departing from the spirit and scope of the invention disclosed.

I claim:

1. Flexible tubing for conducting air or other gases comprising a helical coil of wire having spaced convolutions, connector members secured to each end of said helical coil, a flexible covering over said coil having an inner layer including a lamina of insulating material and an outer layer including a lamina of vapor barrier material, one of said layers including high tensile strength material extending between said connectors in the axial direction of said tubing, and means for mechanically securing said axially disposed high strength material and said vapor barrier material in an air-tight connection to said connector members at each end of said coil.

2. Flexible tubing as defined in claim 1 in which said mechanical securing means comprises a plastic coated metal strap wrapped around said vapor barrier material, said high tensile strength material and said connector at each end and held in place under tension.

3. Flexible tubing as defined in claim 1 in which said lamina of insulating material comprises a layer of glass fibers and a binder retaining said fibers in dimensionally stable positions along the length of said tubing to provide said high tensile strength material.

4. Flexible tubing as defined in claim 1 in which said inner layer also includes a lamina of fabric constructed from said high tensile strength material.

5. Flexible tubing as defined in claim 4 in which said fabric is a glass fiber cloth.

6. Flexible tubing as defined in claim 4 in which said lamina of fabric is disposed adjacent said helical coil.

7. Flexible tubing as defined in claim 6 in which said lamina of fabric is adhesively secured to said connector members to aid in providing said air tight seal between said lamina of fabric and said connectors and to hold said lamina of fabric in place while placing said straps in position.

8. Flexible tubing for conducting air or other gases comprising a helical coil having spaced convolutions, connector members at each end of said helical coil, a flexible covering over said coil having an inner layer including a lamina of insulating material and an outer layer including a lamina of vapor barrier material, said inner layer including high tensile strength material extending between said connectors in the axial direction of said tubing, and strap means for mechanically securing at least said axially disposed high strength material in a substantially air-tight connection to said connector members at each end of said coil.

9. Flexible tubing comprising a helical coil having spaced convolutions; connector members secured to each end of said helical coil; a flexible covering over said coil having an inner layer, including a lamina of insulating material and a lamina of glass fiber fabric adjacent said coil, and an outer layer including a protective lamina, and strap means for mechanically securing at least said lamina of glass fiber fabric around each of said end connector members.

10. Flexible tubing comprising a helical coil having spaced convolutions; stove-pipe connector members at each end of and nested within said helical coil; an inner layer over said coil including a lamina of glass fiber fabric adjacent said coil, and a lamina of insulating material over said lamina of fabric; an outer layer of vapor barrier material over said inner layer; and strap means around said inner layer at each end thereof to mechanically secure said inner layer to each of said connector members.

11. Flexible tubing for conducting air or other gases comprising a helical coil having spaced convolutions, connector members at each end of said helical coil, a flexible covering over said coil having an inner layer including a lamina of insulating material and an outer layer including a lamina of vapor barrier material, said inner layer including high tensile strength material extending between said connectors in the axial direction of said tubing, and strap means around said inner layer and said connector member at each end of the tubing to hold said inner layer to each of said connector members.

References Cited

UNITED STATES PATENTS

| 2,256,386 | 9/1941 | Farrar et al. | 138—131 |
| 2,980,144 | 4/1961 | Edwards et al. | 138—109 |
| 3,216,459 | 11/1965 | Schroeder et al. | 138—139 |

HENRY S. JAUDON, Primary Examiner

U.S. Cl. X.R.

138—109; 139—139